March 18, 1941.  F. J. OTTLEY  2,235,110

TEMPERATURE COMPENSATED PRESSURE RESPONSIVE INDICATING INSTRUMENT

Filed July 14, 1937  2 Sheets-Sheet 1

Inventor
Frederick J. Ottley.
By Stephen Cerstvik.
Attorney

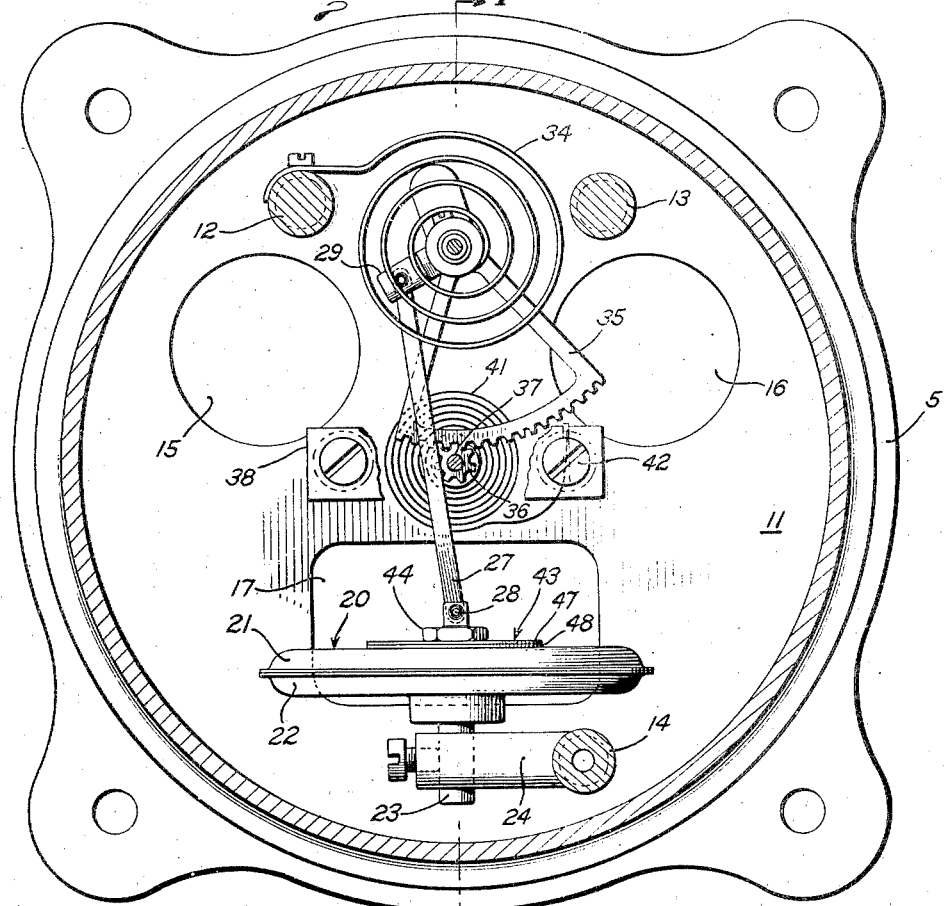
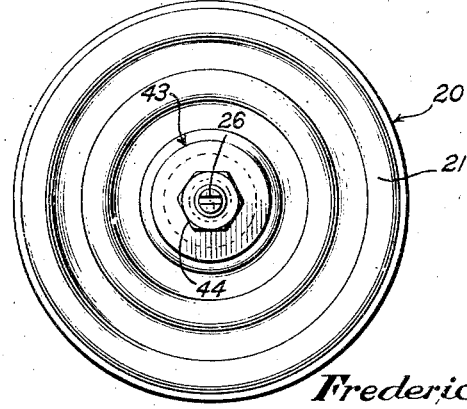

Patented Mar. 18, 1941

2,235,110

UNITED STATES PATENT OFFICE 2,235,110

TEMPERATURE COMPENSATED PRESSURE RESPONSIVE INDICATING INSTRUMENT

Frederick J. Ottley, Bloomfield, N. J., assignor to Bendix Aviation Corporation, South Bend, Ind., a corporation of Delaware Application July 14, 1937, Serial No. 153,663

13 Claims. (Cl. 73—4)

The present invention relates to indicating instruments and more particularly to means for compensating the effect of temperature on pressure responsive indicating instruments.

The invention is particularly adaptable to pressure responsive instruments such as aneroid altimeters or barometers, manifold pressure gages, aircraft airspeed indicators, aircraft rate of climb indicators or to any pressure responsive instruments using an expansible diaphragm device which is actuated by changes in pressure or suction.

Diaphragm devices which are most widely used in instruments of the above-mentioned types generally comprise either a single flexible metal disc which will deflect along an axis passing through its center when subjected to differential pressures on the sides thereof, or may comprise a pair of such discs joined together so as to form an expansible chamber which will expand and contract due to a preponderance of pressure on the inside or outside of said chamber.

The disc or discs forming the expansible diaphragm device are, in the present instance, made of copper beryllium and are usually corrugated to form radially spaced corrugations in order to make the diaphragm device more flexible, and when used in pressure responsive indicating instruments such a diaphragm device is caused to deflect, i. e., expand or contract when pressure or suction is applied thereto internally or externally thereof. The motion thus produced by the expansion and contraction of the flexible wall or walls of the device is transmitted through suitable mechanism, generally an amplifying mechanism, to a pointer or dial or other suitable indicating means to indicate pressure, changes of pressure, or other units which depend on or are proportional to pressure. It is to be understood that the term "pressure," as used herein, may be sub-atmospheric pressure or superatmospheric pressure.

Certain instruments such, for example, as aircraft instruments, by their very nature, are subject to a very wide range of temperatures because they are required to operate at many altitudes and in many climates. For example, on any one flight of an aircraft the change in temperature may be very rapid, as when the aircraft climbs to a high altitude or descends from a high altitude. The effect of such changes in temperature from either a relatively low temperature to a relatively high temperature or vice versa is twofold.

The first effect is that the frame, links, levers, gears, shafts and other parts of the instrument and its mechanism change their dimensions and possibly their shapes. In cold temperatures, for example, the dimensions of such parts decrease in proportion to the temperature drop.

The second effect is that the physical characteristics of the material out of which the diaphragm devices are made changes.

A metal diaphragm device is an elastic element and the deflection obtained from it depends on the pressure applied thereto, the shape and number of radially spaced corrugations, if corrugated, and also on the modulus of elasticity of the metal used.

Once a diaphragm device is made, its deflection at a given temperature would always be the same if the modulus of elasticity of the material used to make the device did not change. The modulus of elasticity of the generally used spring and diaphragm materials such as phosphor-bronze or copper beryllium is, however, affected by temperature and if an instrument provided with a flexible metal diaphragm is subjected to a temperature different than that at which it was calibrated, then the deflection at a given temperature is no longer the same and the indication of the instrument is incorrect. This effect is, of course, most pronounced at extremely hot and cold temperatures.

Also, aircraft instruments are usually tested at room temperature (approximately 21° C. or 70° F.) and at a cold temperature of about —35° C. or —31° F., and it has been found that when an instrument using a diaphragm device of the type referred to above is passing from the one extreme temperature to the other, the temperature change does not have an immediate effect on all parts of the instrument. The result is that the reading of the instrument lags from the true reading until the temperature has its full effect on all parts, at which time the reading again becomes correct. There is, therefore, a definite time interval before the instrument returns to the correct reading.

Heretofore, bi-metal strips have been employed in and as a part of the transmission mechanism between the diaphragm device and the rockshaft which actuates the pointer, to overcome both the effect of a change in modulus of elasticity of the diaphragm material due to changes in temperature and the effect of the change in dimensions and shape of the parts because of expansion and contraction of such parts due to changes in temperature.

The method of overcoming the first effect is generally referred to as "range compensation" and is usually accomplished by providing an adjustable bi-metal strip attached to the rockshaft to constitute a lever arm by which the rockshaft is actuated, and adjusting the effective length of the strip so that the pointer, when actuated by the rockshaft through suitable gears, will indicate correctly throughout the indicating range of the pointer on its scale at any temperature between an extreme low temperature and an extreme high temperature.

The method of overcoming the second effect is usually referred to as "zero compensation" and is generally accomplished by providing a second adjustable bi-metal strip connected to a post at the center of the diaphragm device to form a lever arm extending in a plane parallel to the plane of the diaphragm, said strip being then connected to one end of a link which has its other end connected to the first bi-metal strip carried by the rockshaft. The effective length of the second bi-metal strip is adjusted so that the pointer will remain at zero on the scale at any temperature between the extreme low and high temperatures to which the instrument may be subjected. Thus, two bi-metal strips are necessary and both of them are in and form a part of the transmission mechanism between the diaphragm device and the rockshaft which actuates the pointer through suitable gears.

One of the objects of the present invention is to provide in an instrument having a diaphragm device actuating a pointer through a transmission mechanism, novel means independent of said transmission mechanism but attached to the diaphragm device for producing both range compensation and zero compensation whereby the pointer indicates correctly at zero and at any other reading on the scale at all temperatures between the extreme high and low temperatures to which the instrument may be subjected.

Another object is to provide a novel combination comprising an expansible diaphragm device having a flexible wall in the form of a disc of flexible metal, and a circular temperature responsive element attached to said flexible wall coaxially therewith.

A further object of the invention is to provide a novel combination comprising a circular expansible diaphragm device having a flexible wall in the form of a disc of flexible metal provided with radially spaced circular corrugations extending from the center of the disc to its periphery, and a thermostatic disc attached to the diaphragm wall at the center of the latter coaxially therewith and abutting the external raised portion of the first corrugation of the diaphragm wall from the center.

Still another object is to provide a novel temperature compensating element for expansible diaphragm devices to produce both range compensation and zero compensation, and one which is relatively simple and easy to adjust.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention, reference being had for this purpose to the appended claims.

In the drawings wherein like reference characters refer to like parts throughout the several views, Fig. 1 is a vertical longitudinal section of an indicating instrument embodying the novel temperature compensating means of the invention, the section being taken on line 1—1 of Fig. 2;

Fig. 2 is a vertical cross section taken on line 2—2 of Fig. 1;

Fig. 4 is a detail plan view of the diaphragm device shown in Fig. 3.

Figure 1:
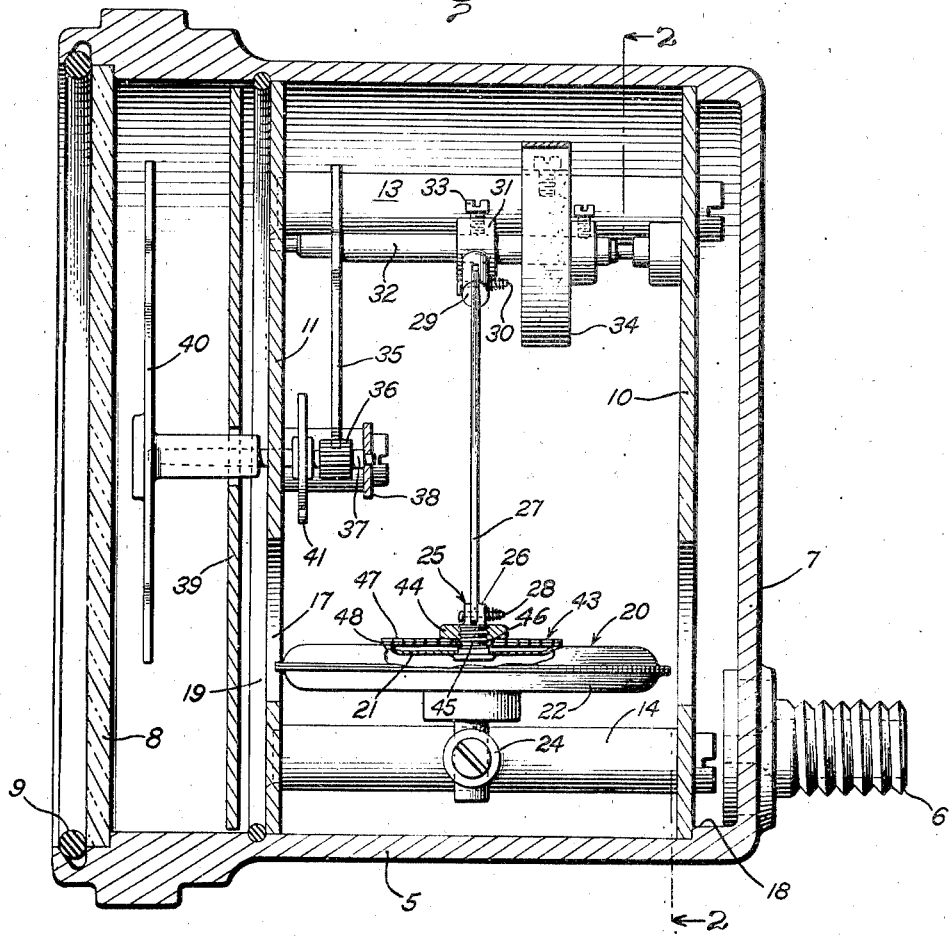

The invention consists substantially in the construction, combination, location and relative arrangement of parts for obtaining the results desired in accordance with the hereinbefore stated objects, as will be more fully hereinafter set forth in the specification, as shown in the drawings by way of example, and as finally pointed out in the claims.

To attain the objects of the invention, the diaphragm device to which the novel temperature compensating means is to be applied may comprise two flexible metal discs joined together at their peripheries to form an expansible and contractible chamber, or the device may comprise a single flexible disc joined at its periphery to a rigid container to provide an expansible chamber having a single flexible wall.

Referring now to the drawings and more particularly to Figs. 1 and 2, the invention is shown applied to an aneroid diaphragm of an aircraft altimeter. In the form shown, the altimeter comprises a cup-shaped instrument casing 5 adapted for mounting on an instrument panel of an aircraft and provided with a threaded nipple 6 in the rear wall 7 for connecting the interior of the casing by a suitable conduit (not shown) to a point of static pressure on the aircraft.

The open end of the casing 5 is closed by means of a suitable cover-glass 8 which is held in place by a resilient clamping ring 9 and through which the indicating means of the instrument may be viewed.

The operating mechanism of the instrument is carried by a framework comprising a pair of spaced parallel circular plates 10 and 11 held together by means of spacing rods 12, 13 and 14, said plates having holes cut out as shown at 15, 16 and 17 in order to reduce the weight of the structure. The rear plate 10 is arranged to abut an internal circumferential ridge 18 provided in the casing 6, and the entire framework is held rigidly in place in said casing by a snap ring 19 which bears against the front plate 11.

The operating mechanism comprises, as illustrated, an expansible diaphragm device 20 which, in the present instance, is an aneroid, i. e., the device is evacuated and sealed because the instrument shown is an altimeter so that as the atmospheric pressure decreases, as when the aircraft carrying the instrument climbs above the surface of the earth, the diaphragm device 20 is caused to expand due to a preponderance of pressure on the inside thereof.

Figure 3:
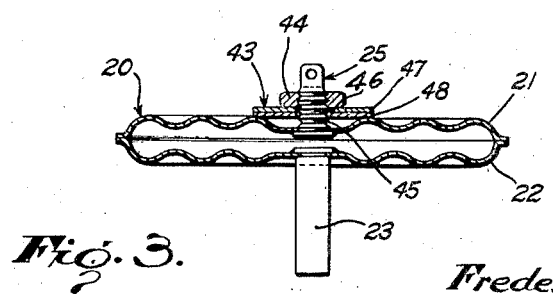
Fig. 3 is a detail section of a diaphragm device showing the novel temperature compensating means of the invention attached thereto and the manner of adjusting said means.

The device 20 is made up of two corrugated flexible metal discs or diaphragms 21 and 22 (Figs. 1 and 3) joined together at their peripheries in any suitable manner as by soldering. A supporting post 23 is attached to the diaphragm 22 in order that the device 20 may be mounted on a fixed support such as an arm 24 carried by the spacing rod 14.

In order that the expanding and contracting movements of the device 20 may be utilized to actuate suitable indicating means for indicating altitude, a lug 25 is attached to the center of diaphragm 21. The outer end of the lug is forked as shown at 26 in Figs. 1 and 4 and has pivotally connected thereto one end of a link 27 by means of a pin 28. The other end of the link 27 is pivotally connected to a forked lever arm 29 by means of a pin 30.

The lever arm 29 is carried by a collar 31 secured to a rockshaft 32 by means of a set screw 33 or it may be formed integrally with said rockshaft 32 if desired. The rockshaft is journaled at its ends in bearings provided in the plates 10 and 11 so that it may rotate upon actuation of the lever arm 29 by the link 27 when the diaphragm device 20 expands and contracts.

A relatively heavy flat coil spring 34 is provided encircling the rockshaft 32 so that upon expansion of the diaphragm device 20, the rockshaft is rotated in one direction against the tension of said spring, and when the diaphragm device contracts, the rockshaft is rotated in the opposite direction by the spring the outer end of which is attached to the spacing rod 12 and its inner end to the rockshaft (Fig. 2).

Carried by and rotatable with the rockshaft 32 is a gear sector 35 which meshes with and drives a pinion 36 secured to a stub shaft 37 one end of which is journaled in plate 11 and the other end in a bracket 38 carried by said plate 11. The end which is journaled in plate 11 projects through said plate and through a dial 39 and has secured thereto a pointer 40 which cooperates with a scale (not shown) provided on the dial 39, the latter and the pointer 40 comprising the indicating means of the altimeter.

A hair spring 41 is provided to take up the backlash between gear sector 35 and pinion 36, one end of said hair spring being connected to the stub shaft 37 and the other end to the bracket 38 by means of a screw 42 (Fig. 2).

Thus it will be seen that as the diaphragm device expands and contracts, the pointer 40 is actuated thereby over the dial 39 through the link 27, lever arm 29, rockshaft 32, sector 35, pinion 36 and shaft 37.

Novel means are now provided in accordance with the invention for compensating the altimeter for temperature errors at the zero of the indicating scale and throughout the range of the scale, whereby the instrument indicates the correct altitude at all readings from zero to the maximum reading on the scale regardless of changes in temperature, i. e., said novel means provide zero compensation as well as range compensation.

In the illustrated embodiment said compensating means are shown in the form of a thermostatic disc 43 attached to the flexible diaphragm 21 at the center thereof by means of an internally threaded nut 44 which engages threads 45 provided on the lug 25 which passes through a central opening 46 in the thermostatic disc 43. The thermostatic disc consists of two discs 47 and 48 of dissimilar metals bonded together, i. e., of metals having different temperature coefficients of expansion, and is attached to the diaphragm device coaxially therewith and in such a manner that said disc bears against the upper projection of one of the corrugations of the diaphragm, whereby flexing of the thermostatic disc due to changes in temperature applies a correcting force on the diaphragm such that errors due to changes in the modulus of elasticity of the diaphragm material and errors due to changes in dimensions of the elements of the transmission mechanism are automatically compensated.

The correct amount of compensating effect to be produced by the thermostatic disc 43 may be obtained by adjusting the nut 44 so as to initially stress the diaphragm device to impart thereto characteristics such that the errors due to temperature changes are corrected.

For example, the nut 44 may be turned so as to cause the thermostatic disc 43, at room temperature, to press on the first central corrugation of the diaphragm 21, thereby exerting an upward pull on the center of the diaphragm, and then when the instrument is subjected to colder temperatures, the thermostatic disc will flex so that it will become slightly dished upwardly, i. e., the center of the disc will move downwardly, thereby releasing the pull on the diaphragm the required amount to produce the correct amount of compensation. The flexing or "dishing" of the disc 43 is, of course, proportional to the drop in temperature.

There are thus provided novel temperature responsive means for providing both zero compensation and range compensation in an indicating instrument of the type having an expansible diaphragm device whereby errors due to temperature changes are corrected at all points of the scale of the instrument, and more particularly temperature responsive means are provided which are not in the transmission mechanism and do not form a part thereof but rather comprise a functional part of the diaphragm device.

Although only one embodiment of the invention has been illustrated and described, various changes in form and relative arrangement of parts, which will now appear to those skilled in this art, may be made without departing from the scope of the invention. Reference is, therefore, to be had to the appended claims for a definition of the limits of the invention.

What is claimed is:

1. In a pressure responsive indicating instrument, the combination of a diaphragm device having a disc portion with radially spaced corrugations, and temperature compensating means comprising a thermostatic disc attached to the center of said corrugated disc portion coaxially therewith and in such a manner that said thermostatic disc bears against one of the radially spaced corrugations.

2. In a pressure responsive indicating instrument, the combination of a diaphragm device having a disc portion with radially spaced corrugations, and temperature compensating means comprising a thermostatic disc attached to the center of said corrugated disc portion coaxially therewith and in such a manner that said thermostatic disc bears against one of the radially spaced corrugations, and means for adjusting said thermostatic disc with respect to said diaphragm device.

3. In combination, a pressure responsive diaphragm device comprising a flexible metal disc provided with radially spaced circular corrugations, and a thermostatic disc attached to said corrugated diaphragm disc coaxially therewith and in such a manner that said thermostatic disc abuts the first central corrugation of the diaphragm disc.

4. In combination, a pressure responsive diaphragm device comprising a flexible metal disc provided with radially spaced circular corrugations, and a thermostatic disc attached to said corrugated diaphragm disc coaxially therewith and in such a manner that said thermostatic disc abuts the first central corrugation of the diaphragm disc, and means for adjusting said thermostatic disc with respect to said diaphragm disc.

5. In an aircraft altimeter having a circular expansible aneroid provided with radially spaced corrugations, indicating means, and means connecting said aneroid and said indicating means for actuating the latter upon expansion of the former, the combination with said aneroid of a thermostatic disc attached to the center of said aneroid coaxially therewith and in such a manner that said disc abuts one of the corrugations of said aneroid, and means for adjusting said thermostatic disc with respect to said aneroid.

6. In combination, a pressure responsive device comprising a flexible metal disc provided with radially spaced corrugations, and a circular thermostatic element attached to said flexible disc coaxially therewith and in such a manner that said thermostatic element abuts one of the corrugations of said flexible disc.

7. In a pressure responsive indicating instrument of the type having indicating means, a circular pressure responsive diaphragm device comprising a flexible metal disc provided with radially spaced corrugations, and transmission means connecting said indicating means and said diaphragm device, the combination with said diaphragm device of temperature compensating means comprising a thermostatic disc attached to the center of the corrugated disc of the diaphragm device coaxially therewith and in such a manner that said thermostatic disc bears against one of said corrugations.

8. In combination, a pressure responsive device comprising a flexible metal element provided with spaced corrugations, and a circular thermostatic element attached to said flexible element at the center thereof and in such a manner that said thermostatic element having its outer periphery abutting one of the corrugations of said flexible element.

9. In a pressure responsive indicating instrument, a circular pressure responsive diaphragm device, and temperature compensating means comprising a circular temperature responsive device coaxially attached to the center of said diaphragm device and having its periphery in contact with the expanding portion of said diaphragm device whereby a stress varying with temperature is produced on said diaphragm by said compensating means.

10. In a pressure responsive indicating instrument, the combination of a circular pressure responsive diaphragm device, and temperature compensating means comprising a circular temperature responsive device coaxially attached to the center of said diaphragm device and in contact with the expanding portion of said diaphragm device, and means for adjusting said temperature responsive device with respect to said diaphragm device.

11. In a pressure responsive indicating instrument of the type having indicating means, a pressure responsive diaphragm device, and transmission means connecting said indicating means and said diaphragm device for actuation of the former by the latter, the combination with said diaphragm device, of a temperature responsive element separate from said transmission means but attached to the center of said diaphragm device in intimate contact with the movable portion thereof at points on diametrically opposite sides of and spaced from the center of said diaphragm device to produce in the latter a stress varying with temperature and thus to provide zero compensation and range compensation for substantially reducing errors due to temperature changes.

12. In a pressure responsive indicating instrument of the type having indicating means, a pressure responsive diaphragm device, transmission means connecting said indicating means and said diaphragm device for actuation of the former by the latter, the combination with said diaphragm device, of a temperature responsive element separate from said transmission means but attached to the center of said diaphragm device in intimate contact with the movable portion thereof at points on diametrically opposite sides of and spaced from the center of said diaphragm device to produce in the latter a stress varying with temperature and thus to provide zero compensation and range compensation for substantially reducing errors due to temperature changes, and means for adjusting said temperature responsive element with respect to said diaphragm device at the center of the latter.

13. In combination, a pressure responsive expansible and contractible diaphragm device, and a temperature responsive element attached to the center of said diaphragm device and in intimate contact with the expansible portion thereof at points on opposite sides of and spaced from said center to produce in said diaphragm device a stress varying with temperature for substantially reducing errors of said diaphragm device due to temperature changes.

FREDERICK J. OTTLEY.